United States Patent [19]
Pan et al.

[11] Patent Number: 5,861,924
[45] Date of Patent: Jan. 19, 1999

[54] METHODS AND SYSTEMS FOR PROCESSING VIDEO SIGNAL PIXEL DATA

[75] Inventors: ShaoWei Pan, Lake Zurich; Shay-Ping T. Wang, Long Grove; Nicholas M. Labun, Chicago; Jeffrey G. Toler, Algonquin; Michael K. Lindsey, Barrington, all of Ill.

[73] Assignee: Motorola, Inc., Schaumburg, Ill.

[21] Appl. No.: 816,236

[22] Filed: Mar. 13, 1997

Related U.S. Application Data

[63] Continuation-in-part of Ser. No. 496,641, Jun. 29, 1995.
[51] Int. Cl.⁶ .................................................. H04N 7/01
[52] U.S. Cl. ......................... 348/451; 348/558; 348/450
[58] Field of Search ......................... 348/448, 450–453, 348/558, 702, 458

[56] References Cited

U.S. PATENT DOCUMENTS

| | | | |
|---|---|---|---|
| 4,870,481 | 9/1989 | Kawamata | 358/31 |
| 4,876,596 | 10/1989 | Faroudja | 358/140 |
| 4,967,271 | 10/1990 | Campbell et al. | 358/105 |
| 4,982,280 | 1/1991 | Lyon et al. | 358/105 |
| 4,989,090 | 1/1991 | Campbell et al. | 358/140 |
| 5,014,119 | 5/1991 | Faroudja | 358/37 |
| 5,023,717 | 6/1991 | Lamnabhi et al. | 358/140 |
| 5,040,062 | 8/1991 | Knauer et al. | 358/141 |
| 5,049,993 | 9/1991 | LeGall et al. | 358/140 |
| 5,124,688 | 6/1992 | Rumball | 340/703 |
| 5,151,783 | 9/1992 | Faroudja | 358/133 |
| 5,159,451 | 10/1992 | Faroudja et al. | 358/140 |
| 5,233,684 | 8/1993 | Ulichney | 395/131 |
| 5,243,433 | 9/1993 | Hailey | 358/214 |
| 5,274,447 | 12/1993 | Nakagaki et al. | 358/140 |
| 5,280,351 | 1/1994 | Wilkinson | 358/140 |
| 5,291,280 | 3/1994 | Faroudja et al. | 348/416 |
| 5,307,164 | 4/1994 | Dong, II | 348/448 |
| 5,339,109 | 8/1994 | Hong | 348/441 |
| 5,347,314 | 9/1994 | Faroudja et al. | 348/448 |
| 5,361,099 | 11/1994 | Kim | 348/555 |
| 5,371,549 | 12/1994 | Park | 348/564 |
| 5,387,937 | 2/1995 | Dorricott et al. | 348/453 |
| 5,389,974 | 2/1995 | Bae | 348/555 |
| 5,398,071 | 3/1995 | Gove et al. | 348/558 |
| 5,402,186 | 3/1995 | Kawai | 348/448 |
| 5,410,354 | 4/1995 | Uz | 348/426 |
| 5,414,469 | 5/1995 | Gonzales et al. | 348/408 |
| 5,428,397 | 6/1995 | Lee et al. | 348/448 |
| 5,428,398 | 6/1995 | Faroudja | 348/452 |
| 5,508,750 | 4/1996 | Hewlett et al. | 348/558 |
| 5,606,373 | 2/1997 | Dopp et al. | 348/558 |
| 5,689,301 | 11/1997 | Christopher et al. | 348/457 |

FOREIGN PATENT DOCUMENTS

| | | |
|---|---|---|
| PCT/CA93/ 0055 | 12/1994 | WIPO . |
| WO 95/19682 | 7/1995 | WIPO . |

*Primary Examiner*—Victor R. Kostak
*Attorney, Agent, or Firm*—James E. Gauger

[57] ABSTRACT

In a video processing system (14), a method of detecting and compensating for motion of an image which includes the steps of: detecting a first pixel value, a second pixel value, and a third pixel value, the first pixel value of a first scan line in a first field, the second pixel value of a second scan line in the first field, and the third pixel value in a second field; providing a motion indicator based on the first, second, and third pixel values; selecting a plurality of interpolation coefficients from a memory based on the motion indicator signal; and providing an interpolated color space pixel based on a first color space pixel associated with the first pixel value, a second color space pixel associated with the second pixel value, and based on the plurality of interpolation coefficients.

23 Claims, 6 Drawing Sheets

METHODS AND SYSTEMS FOR PROCESSING VIDEO SIGNAL PIXEL DATA

CROSS-REFERENCES

The present application is a continuation-in-part of patent application Ser. No. 08/496,641 filed Jun. 29, 1995, which is incorporated by reference herein.

FIELD OF THE INVENTION

The present invention relates to methods and systems for detecting motion of an image and processing video signals.

BACKGROUND OF THE INVENTION

In video processing systems, such as systems that enhance a standard NTSC television signal to produce a higher resolution signal for display on a television display, a common problem is accounting for motion in an image to be displayed. To address this problem, many different circuits have been proposed to detect and to compensate for the motion of the image. However, such circuits typically include many electronic components, resulting in relatively low efficiency, high power, and high hardware costs.

Accordingly, there is a need for an improved method and system for detecting motion of an image in a video processing system. It would be particularly desirable if such improved method and system provided higher efficiency, lower power, and lower costs than conventional video processing methods and systems.

BRIEF DESCRIPTION OF THE DRAWINGS

The invention is pointed out with particularity in the appended claims. However, other features and advantages of the invention may be better understood by referring to the following detailed description in conjunction with the accompanying drawings in which:

DETAILED DESCRIPTION OF THE PREFERRED EMBODIMENTS(S)

Figure 1:
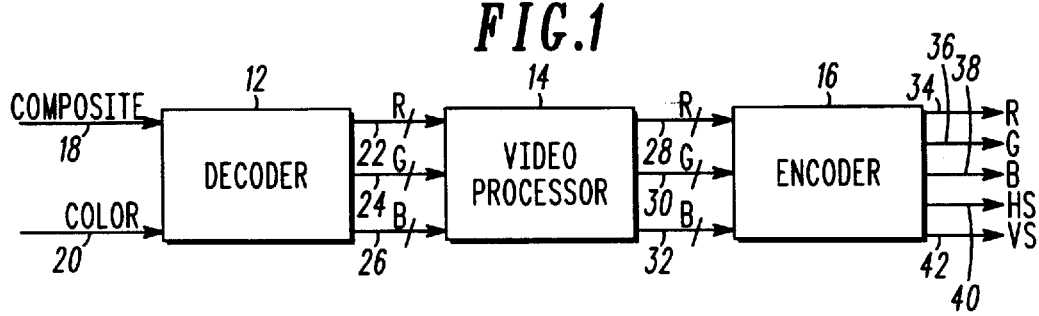
FIG. 1 is a block diagram of an embodiment of a video processing system.

Referring to FIG. 1, a block diagram of an embodiment of a video system 10 is shown. The Video system 10 includes a decoder 12, a video processor 14, and an encoder 16. The decoder 12 receives a composite video signal 18 and color information signal 20 and produces a first parallel color component 22, such as the red color component, a second parallel color component 24, such as the green color component, and a third parallel color component 26, such as the blue color component. Video processor 14 receives the first, second, and third parallel color component signals 22, 24, 26, and produces high speed interpolated color component signals 28, 30, and 32. The encoder 16 maps the interpolated color component signals 28, 30, 32 into serial color component signals 34, 36, 38 and other output signals, such as horizontal synchronization (HS) signal 40 and vertical synchronization (VS) signal 42 to display an image on a display device (not shown), such as a television or computer monitor, based on the image information contained in the serial color component signals 34, 36, 38. The video system 10 may be implemented as a board that fits inside of a computer monitor or a television.

Figure 2:
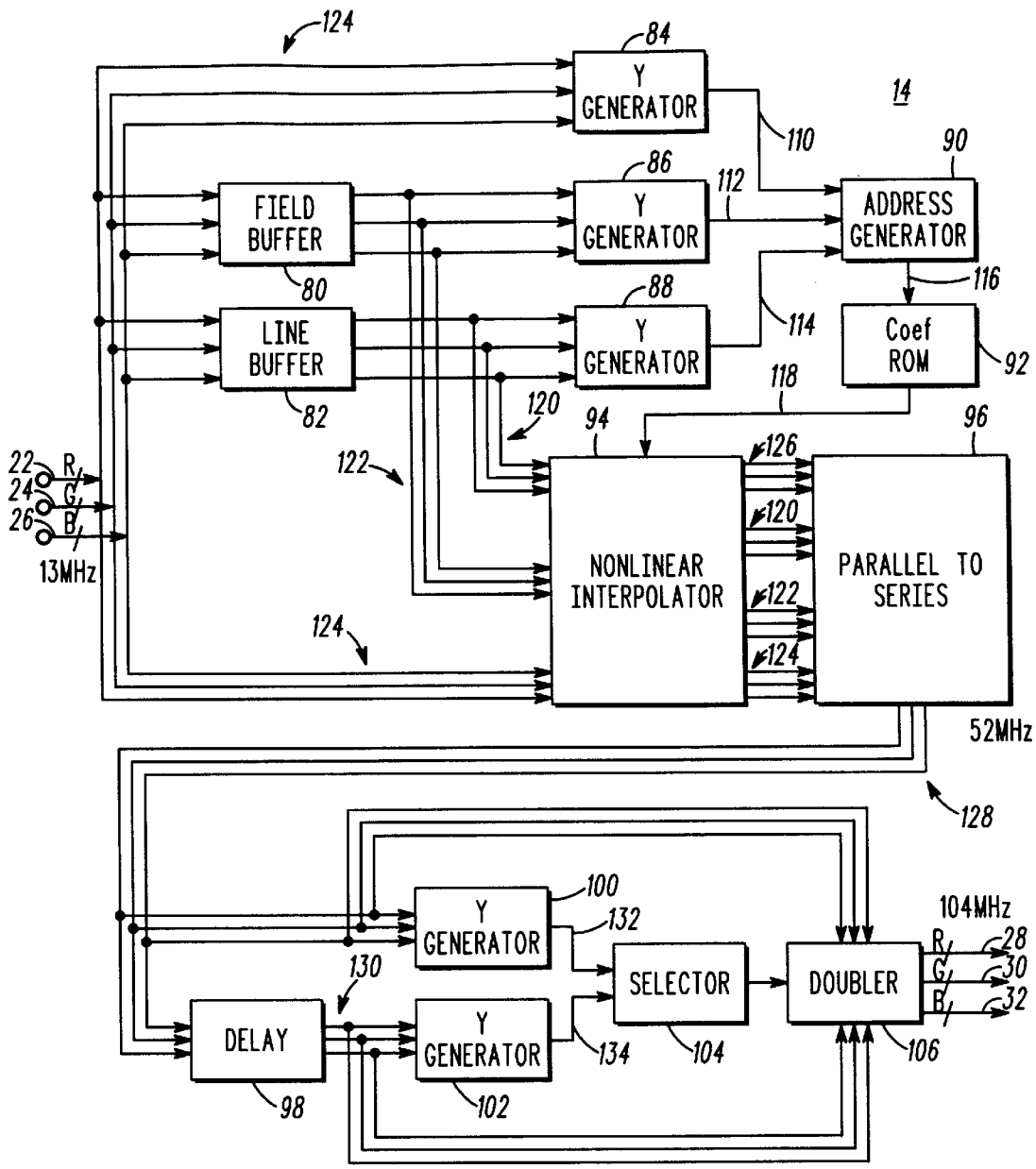
FIG. 2 is a block diagram of an embodiment of a video processor in accordance with the present invention.

Referring to FIG. 2, a particular embodiment of the video processor 14 is illustrated. Video processor 14 includes a field buffer 80, a line buffer 82, five luminance generators 84, 86, 88, 100, and 102, an address generator 90, a memory 92, an interpolator 94, a parallel to serial converter 96, a delay 98, a selector 104, and a clock doubler 106.

In this particular embodiment, the field buffer 80 is a model UPD 4228064-30 type buffer from NEC, and the line buffer 82 is implemented with a NEC UPD421926-5 buffer. The luminance generators 84, 86, 88, 100, and 102 are standard table lookup type luminance generators. The address generator 90 is implemented as a FPGA ispLSI1032-80 from Lattice Semiconductor Corp. of Hillsboro, Oreg. The memory 92 is preferably a standard read only memory that contains a plurality of interpolation coefficients. The interpolator 94 is preferably implemented as a FPGA from Lattice. The parallel to serial converter 96 is preferably a FPGA type converter from Lattice. The delay 98 is preferably a register. The selector 104 is preferably a threshold decision circuit, and the doubler is preferably a ispLSI1016-90 FPGA from Lattice. Although specific hardware devices have been described above for a particular illustrative embodiment, the specific devices and structure described is just one of many example configurations and it is contemplated that many modification and alterations of the video processor of FIG. 2 are possible, including a variety of alternative hardware or software implementations. Therefore, the scope of the present invention is not to be limited by the specific devices or the specific arrangement of those devices set forth above.

During operation, the color component signals 22, 24, and 26, referred to as a group as color space signal 124, are received and stored in the field buffer 80 and the line buffer 82, and are received by the interpolator 124 and the luminance generator 84. The field buffer 80 produces a field delayed color space signal 122 which is a field delayed version of the color space signal 124, and the line buffer 82 produces a line delayed color space signal 120 which is a line delayed version of the color space signal 124. Luminance generator 84 produces a first luminance signal 110, luminance generator 86 produces a second luminance signal 112, and luminance generator 88 produces a third luminance signal 114. The first luminance signal 110 represents a measure of luminance for the color space signal 124. Similarly, the second luminance signal 112 represents a measure of luminance of the field delayed signal 122, and the third luminance signal 114 represents a measured luminance of the line delayed color space signal 120. The address generator 90 receives the first, second, and third luminance signals 110, 112, 114 and produces an address signal 116 which is fed into memory 92. The memory 92 produces a data signal 118 that preferably carries interpolation coefficient data to the interpolator 94.

Interpolator 94 includes logic circuitry to produce interpolated color space signal 126 based on the color space signal 124, the field delayed color space signal 122, the line delayed signal 120, and based on the data signal 118 carrying the coefficient data from memory 92. The interpolated color space signal 126 is a vertically interpolated signal. Details for the decision logic and the method of performing interpolation within interpolator 94 is described in further detail below in reference to FIG. 4. Parallel to serial converter 96 receives the interpolated color space signal 126, as well as color space signals 120, 122, and 124 passed through interpolator 94 and converts these parallel signals to a serial output signal 128, which is preferably a 52 MHz serial data signal.

Serial output signal 128 is fed to delay 98 and to luminance generator 100. Luminance generator 100 produces luminance signal 132 which is fed to selector 104. Delay 98 produces a delayed serial signal 130 which is passed to luminance generator 102 producing luminance signal 134, which is fed to selector 104. Selector 104, in response to luminance signals 132 and 134, produces a control signal for doubler 106 which produces high speed interpolated color space signals 28, 30, and 32 based on the serial signal 128, the delayed serial signal 130, and on the control signal from the selector 104. In this embodiment, delay unit 98 is used to perform horizontal interpolation and the time delay for the delay unit 98 is preferably selected to provide a delay of one half of the time between horizontally adjacent pixels to be displayed. In this manner, the delay unit 98, luminance generators 100 and 102, selector 104, and doubler 106 form a horizontal interpolation module.

Figure 5:
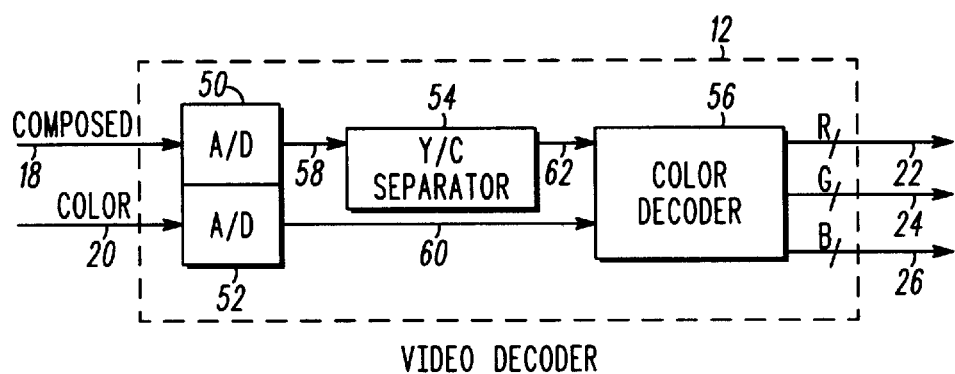
FIG. 5 is a block diagram of the decoder of FIG. 1.

Referring to FIG. 5, a more detailed block diagram of decoder 12 is shown. The decoder 12 includes analog to digital converters 50, 52, a luminance chrominance separator 54, and a color decoder 56. In the preferred embodiment, the decoder 12 is a BT812 type decoder from Brooktree of San Diego, Calif. The first analog to digital converter 50 converts the composed signal 18 into a digital signal 58 which is fed to luminance/chrominance separator 54 to produce separated signal 62. Second analog to digital converter 52 converts the color signal 20 to a digital color signal 60. Color decoder 56 receives separated signal 62 and digital color signal 60 and produces color component signals 22, 24, and 26.

Figure 6:
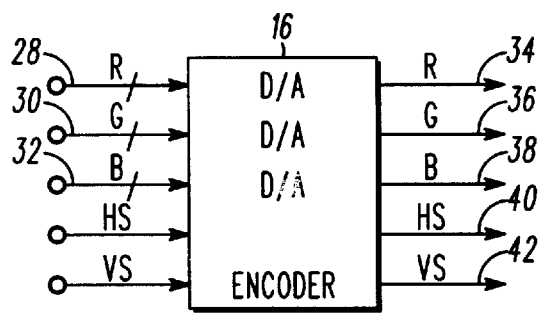
FIG. 6 is a block diagram of the encoder of FIG. 1.

Referring to FIG. 6, an example of an encoder 16 that may be used with the video processor system 10 is illustrated. Encoder 16 is preferably a BT473 type encoder available from Brooktree.

Further detail for the video decoder 12 and encoder 16 can be found in "Video Demystified" chapter 5 and 6, (by Keith Jack, Hightext Interactive, Inc., 1996), incorporated by reference herein.

Figure 3:
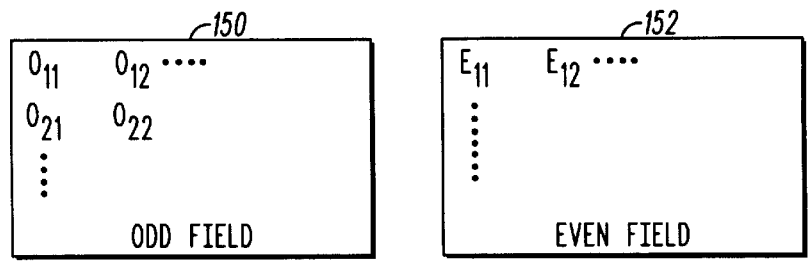
FIG. 3 is an illustrative diagram of an image field to be displayed.

Referring to FIG. 3, two fields of an image to be displayed on a display device is generally illustrated. The displayed image includes a first field 150, which is this example is an odd field 150, and a second field 152, which in this example is an even field 152. Odd field 150 includes a plurality of pixels. In the preferred embodiment, the odd field includes 242.5 rows and either 720 or 640 columns of pixels. For convenience and for illustrative purposed, a few representative pixels have been labeled O11, O12, O21, and O22. Pixels O11 and O12 are in one row of the field 150 and pixels O21 and O22 are in a subsequent row of the field 150. In field 152, which is the even field, representative pixels E11 and E12 correspond to pixels O11 and O12 of field 150. For example, pixel E11 is at the same physical position, but delayed in time by one field from that of pixel O11.

Figure 4:
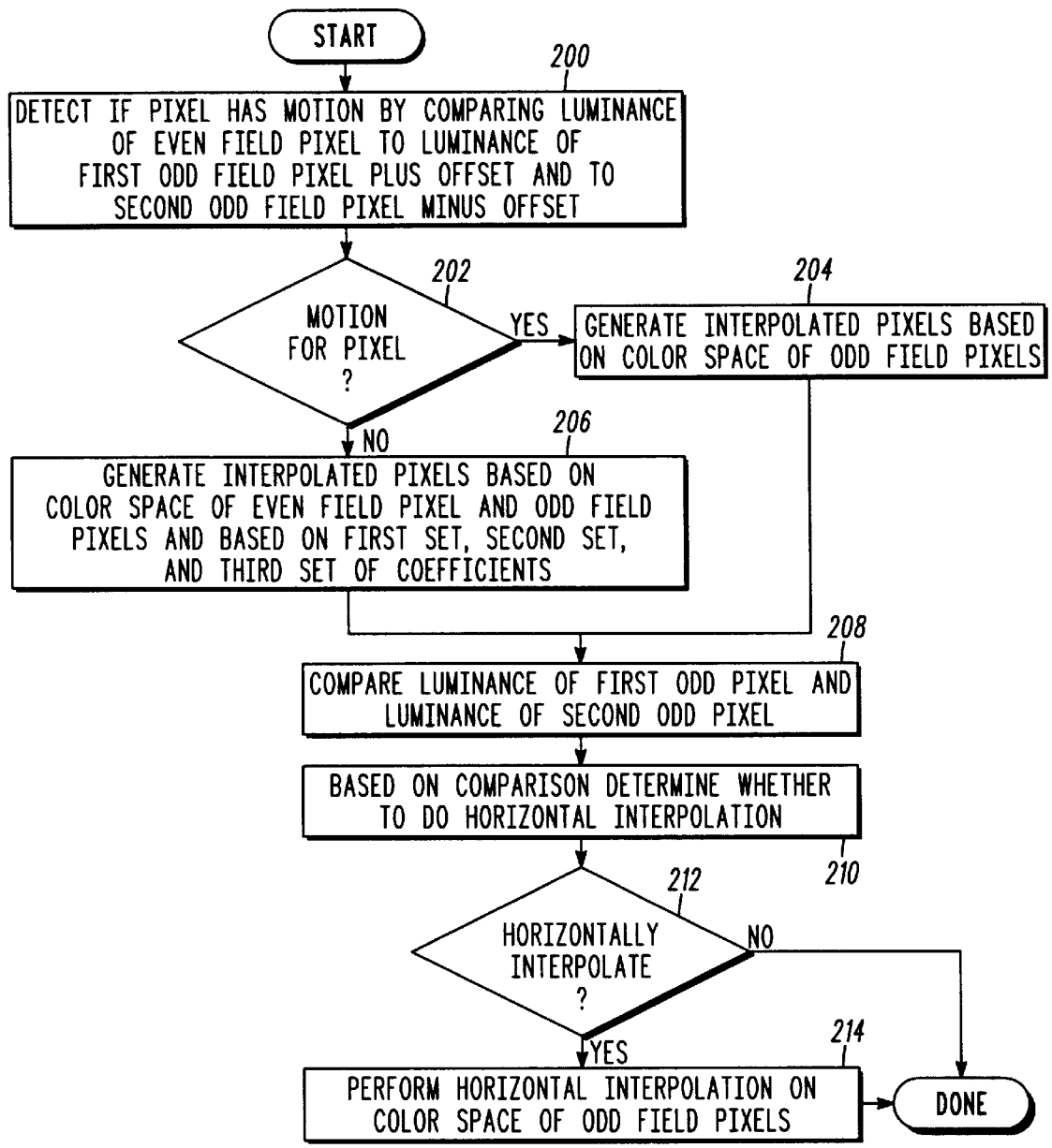
FIG. 4 is a flow chart of a method of performing interpolation in accordance with the present invention.

Referring to FIG. 4, a flow chart of a method of performing interpolation is illustrated. The method provides an example of the processing steps to produce interpolated color space pixels for one pixel of one field. It should be understood that the method of FIG. 4 is repeated for each pixel in a field and for a plurality of fields to produce the final image that is displayed. In addition, the method of FIG. 4 provides further details on how the interpolator 94 of FIG. 2 produces the color space interpolated signal 126.

A first step 200 is to detect if a particular pixel is to be interpolated by comparing a luminance value of an even pixel, such as for example a luminance for pixel E11, referred to as Y(E11), to a luminance value of a first odd pixel, such as the luminance of pixel O11, plus an offset, referred to as Y(O11)+delta1, and to a second odd field pixel, such as the luminance of pixel O21, minus an offset, referred to as Y(O21)−delta2.

In a particular exemplary calculation, if (Y(O11)+delta1)>=Y(E11)>=(Y(O21)−delta2) and if (Y(O11)−delta2) <=Y(E11)<=(Y(O21)+delta1), where delta1=8 and delta2=32, is true then the decision is met and motion for the pixel is detected.

Next, at step 202, motion for the pixel is checked. If motion is detected, interpolation pixels are generated based on the color space of an even field pixel and odd field pixels, and based on a plurality of interpolation coefficients, as in step 206. Note that the coefficients are preferably received from the memory 92 and the interpolation pixels are generated by interpolator 94 of the video processor of FIG. 2. If no motion is detected, interpolation pixels are generated based on the color space of odd field pixels, step 204.

In the preferred embodiment, the interpolation pixels for step 206 are determined by the following formulas:
The choice one:
Case 1: Y(O11)>Y(O21)
  If Y(E11)>Y(O11),
    R(G21)=0.05 R(O11)+0.95 R(E11);
    G(G21)=0.05 G(O11)+0.95 G(E11);
    B(G21)=0.05 B(O11)+0.95 B(E11);
    R(G41)=0.05 R(O21)+0.95 R(E11);
    G(G41)=0.05 G(O21)+0.95 G(E11);
    B(G41)=0.05 B(O21)+0.95 B(E11);
  else if Y(E11)>(¾)*Y(O11)+(¼)*Y(O21);
    R(G21)=0.8 R(O11)+0.2 R(E11);
    G(G21)=0.8 G(O11)+0.2 G(E11);
    B(G21)=0.8 B(O11)+0.2 B(E11);
    R(G41)=0.2 R(O21)+0.8 R(E11);
    G(G41)=0.2 G(O21)+0.8 G(E11);
    B(G41)=0.2 B(O21)+0.8 B(E11);
  else if Y(E11)>(¼)*Y(O21)+(¾)*Y(O21);
    R(G21)=0.5 R(O11)+0.5 R(E11);
    G(G21)=0.5 G(O11)+0.5 G(E11);
    B(G21)=0.5 B(O11)+0.5 B(E11);
    R(G41)=0.5 R(O21)+0.5 R(E11);
    G(G41)=0.5 G(O21)+0.5 G(E11);
    B(G41)=0.5 B(O21)+0.5 B(E11);
  else if Y(E11)<Y(O21);
    R(G21)=0.05 R(O11)+0.95 R(E11);
    G(G21)=0.05 G(O11)+0.95 G(E11);
    B(G21)=0.05 B(O11)+0.95 B(E11);
    R(G41)=0.05 R(O21)+0.95 R(E11);

G(G41)=0.05 G(O21)+0.95 G(E11);
B(G41)=0.05 B(O21)+0.95 B(E11);
Case 2: Y(O11)<Y(O21)
  If Y(E11)>Y(O21),
    R(G21)=0.2 R(O11)+0.8 R(E11);
    G(G21)=0.2 G(O11)+0.8 G(E11);
    B(G21)=0.2 B(O11)+0.8 B(E11);
    R(G41)=0.2 R(O21)+0.8 R(E11);
    G(G41)=0.2 G(O21)+0.8 G(E11);
    B(G41)=0.2 B(O21)+0.8 B(E11);
  else if Y(E11)>(¾)*Y(O12)+(¼)*Y(O11);
    R(G21)=0.8 R(O11)+0.2 R(E11);
    G(G21)=0.8 G(O11)+0.2 G(E11);
    B(G21)=0.8 B(O11)+0.2 B(E11);
    R(G41)=0.8 R(O21)+0.2 R(E11);
    G(G41)=0.8 G(O21)+0.2 G(E11);
    B(G41)=0.8 B(O21)+0.2 B(E11);
  else if Y(E11)>(¼)*Y(O12)+(¾)*Y(O11);
    R(G21)=0.5 R(O11)+0.5 R(E11);
    G(G21)=0.5 G(O11)+0.5 G(E11);
    B(G21)=0.5 B(O11)+0.5 B(E11);
    R(G41)=0.5 R(O21)+0.5 R(E11);
    G(G41)=0.5 G(O21)+0.5 G(E11);
    B(G41)=0.5 B(O21)+0.5 B(E11);
  else if Y(E11)<Y(O11);
    R(G21)=0.05 R(O11)+0.95 R(E11);
    G(G21)=0.05 G(O11)+0.95 G(E11);
    B(G21)=0.05 B(O11)+0.95 B(E11);
    R(G41)=0.05 R(O21)+0.95 R(E11);
    G(G41)=0.05 G(O21)+0.95 G(E11);
    B(G41)=0.05 B(O21)+0.95 B(E11);
else if $(Y(E11)>(Y(O11)+\delta_1)$ or $Y(E11)>(Y(O21)+\delta_1)$;

It should be noted that although specific floating point coefficients, such as 0.05 and 0.95, have been designated in the above formulas, the above specific coefficient values may be estimated to more quickly perform certain processing steps. For example, ¹⁄₁₆ can be used as an estimate for 0.05. Since ¹⁄₁₆ may be represented by a binary value, the step of multiplying R(O11) by 0.05 may be implemented using binary shifting instead of a floating point multiplication.

In the preferred embodiment, the interpolation pixels for step 204 are determined by the following formulas:
  The choice two:
Case 1: Y(O11)>Y(O21)
  R(G21)=R(O11)+$\delta_1$;
  G(G21)=G(O11)+$\delta_1$;
  B(G21)=B(O11)+$\delta_1$;
  R(E11)=R(O11)+$\delta_1$;
  G(E11)=G(O11)+$\delta_1$;
  B(E11)=B(O11)+$\delta_1$;
  R(G41)=R(O21);
  G(G41)=G(O21);
  B(G41)=B(O21);
Case 2: Y(O11)<Y(O21)
  R(G21)=R(O11);
  G(G21)=G(O11);
  B(G21)=B(O11);
  R(E11)=R(O21)+$\delta_1$;
  G(E11)=G(O21)+$\delta_1$;
  B(E11)=B(O21)+$\delta_1$;
  R(G41)=R(O21)+$\delta_1$;
  G(G41)=G(O21)+$\delta_1$;
  B(G41)=B(O21)+$\delta_1$;
Else if $(Y(E11)<(Y(O11)-\delta_2)$ or $Y(E11)<(Y(O21)-\delta_2)$
  The choice three:
Case 1: Y(O11)>Y(O21)
  R(G21)=R(O21)−$\delta_2$;
  G(G21)=G(O21)−$\delta_2$;
  B(G21)=B(O21)−$\delta_2$;
  R(E11)=R(O21)−$\delta_2$;
  G(E11)=G(O21)−$\delta_2$;
  B(E11)=B(O21)−$\delta_2$;
  R(G41)=R(O21)−0.5$\delta_2$;
  G(G41)=G(O21)−0.5$\delta_2$;
  B(G41)=B(O21)−0.5$\delta_2$;
Case 2: Y(O11)<Y(O21)
  R(G21)=R(O11)−0.5$\delta_2$;
  G(G21)=G(O11)−0.5$\delta_2$;
  B(G21)=B(O11)−0.5$\delta_2$;
  R(E11)=R(O21)−$\delta_2$;
  G(E11)=G(O21)−$\delta_2$;
  B(E11)=B(O21)−$\delta_2$;
  R(G41)=R(O21);
  G(G41)=G(O21);
  B(G41)=B(O21);

Next, at step 208, a comparison is made between the luminance of a first odd pixel and the luminance of a second odd pixel. This comparison may be made by the selector 104 based on the luminance signals 132 and 134 in the video processor 14. Based on the results of the comparison of step 208, it is determined whether to perform horizontal interpolation, at step 210. One method of determining whether to perform horizontal interpolation is to determine if the absolute value of the difference between the luminance of pixel O11 and the luminance of pixel O12 is less than or equal to a predetermined threshold, such as sixteen. If the absolute value of the above is less than the threshold then interpolation is to be performed, such as by taking an average of each color space value of the first pixel O11 and each color space value of the second pixel O12. Example formulas are set forth below:
  If ABS(Y(O11)−Y(O12))>16
    R(G1)=R(O11);
    G(G1)=G(O11);
    B(G1)=B(O11);
  Else
    R(G1)=(R(O11)+R(O12))/2;
    G(G1)=(G(O11)+G(O12))/2;
    B(G1)=(B(O11)+B(O12))/2;

In this manner, horizontal interpolation is performed when the two adjacent pixel values have similar luminance and not performed when the respective luminance for the two horizontal pixels greatly differ. Finally, if the condition for horizontal interpolation is met, at decision step 212, then horizontal interpolation is performed, at step 214, and processing for the particular pixel is completed.

Figure 7:
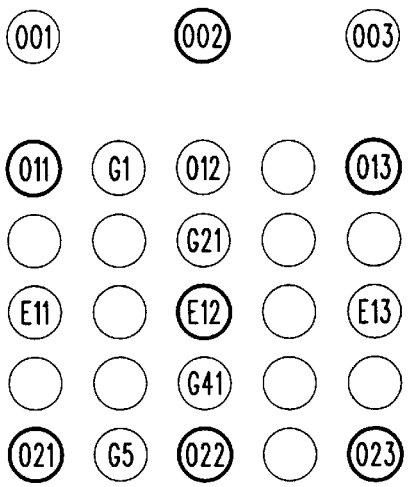
FIG. 7 is an illustrative diagram of an image field to be displayed.

Referring to FIG. 7, a pixel map is disclosed that illustrates another method for performing interpolation. The method produces interpolated luminance values for generated pixels G21 and G41 in accordance with the following formulas:
  If $[Y(O_{12})+\delta] \geq Y(E_{12}) \geq [Y(O_{22})-\delta]$ (The point $E_{12}$ is selected)
    If $[Y(O_{13})+\delta] > Y(E_{12})$ or $[Y(O_{11})+\delta] > Y(E_{12})$ Then (Triangle case) $Y(G_{21}) = \tfrac{7}{8}(O_{12}) + \tfrac{1}{8}Y(E_{12})$ Else If $\|Y(O_{02})-Y(O_{12})\| < \|Y(O_{12})-Y(E_{12})\| - \delta_2$ Then
(Parallel case) $Y(G_{21}) = \frac{7}{8}Y(O_{12}) + \frac{1}{8}Y(E_2)$ Else If $\{Y(O_{21}) < Y(E_{12})$ or $Y(O_{23}) < Y(E_{12})\}$ Then
(Triangle case) $Y(G_{41}) = \frac{7}{8}Y(O_{22}) + \frac{1}{8}Y(E_{12})$ Else If $\{\|Y(E_{12})-Y(O_{22})\| < \|Y(O_{22})-Y(O_{32})\| + \delta_2$ Then
(Parallel case) $Y(G_{41}) = \frac{7}{8}Y(O_{22}) + \frac{1}{8}Y(E_{12})$ Else Then
$Y(G_{21}) = 0.5[Y(O_{12}) + Y(E_{12})]$
$Y(G_{41}) = 0.5[Y(O_{22}) + Y(E_{12})]$ Else IF $[Y(O_{22}) + \delta] > Y(E_{12}) > [Y(O_{12}) - \delta]$ (The point $E_{12}$ is selected)

If $[Y(O_{21}) + \delta] > Y(E_{12})$ or $[Y(O_{23}) + \delta] > Y(E_{12})$ Then
(Triangle case) $Y(G_{41}) = \frac{7}{8}Y(O_{22}) + \frac{1}{8}Y(E_{12})$ Else If $\|Y(O_{32})-Y(O_{22})\| < \|Y(O_{22})-Y(E_{12})\| \delta_2$ Then
(Parallel case) $Y(G_{41}) = \frac{7}{8}Y(O_{22}) + \frac{1}{8}Y(E_{12})$ Else If $\{Y(O_{11}) < Y(E_{12})$ or $Y(O_{13}) < Y(E_{12})\}$ Then
(Triangle case) $Y(G_{21}) = \frac{7}{8}Y(O_{12}) + \frac{1}{8}Y(E_{12})$ Else If $\{\|Y(E_{12})-Y(O_{12})\| > \|Y(O_{12})-Y(O_{02})\| + \delta_2$ Then
(Parallel case) $Y(G_{21}) = \frac{7}{8}Y(O_{12}) + \frac{1}{8}Y(E_{12})$ Else Then
$Y(G_{21}) = 0.5[Y(O_{12}) + Y(E_{12})]$
$Y(G_{41}) = 0.5[Y(O_{22}) + Y(E_{12})]$ Else IF $Y(O_{12}) > Y(O_{22})$ (The point $E_{12}$ is not selected)

Figure 8:
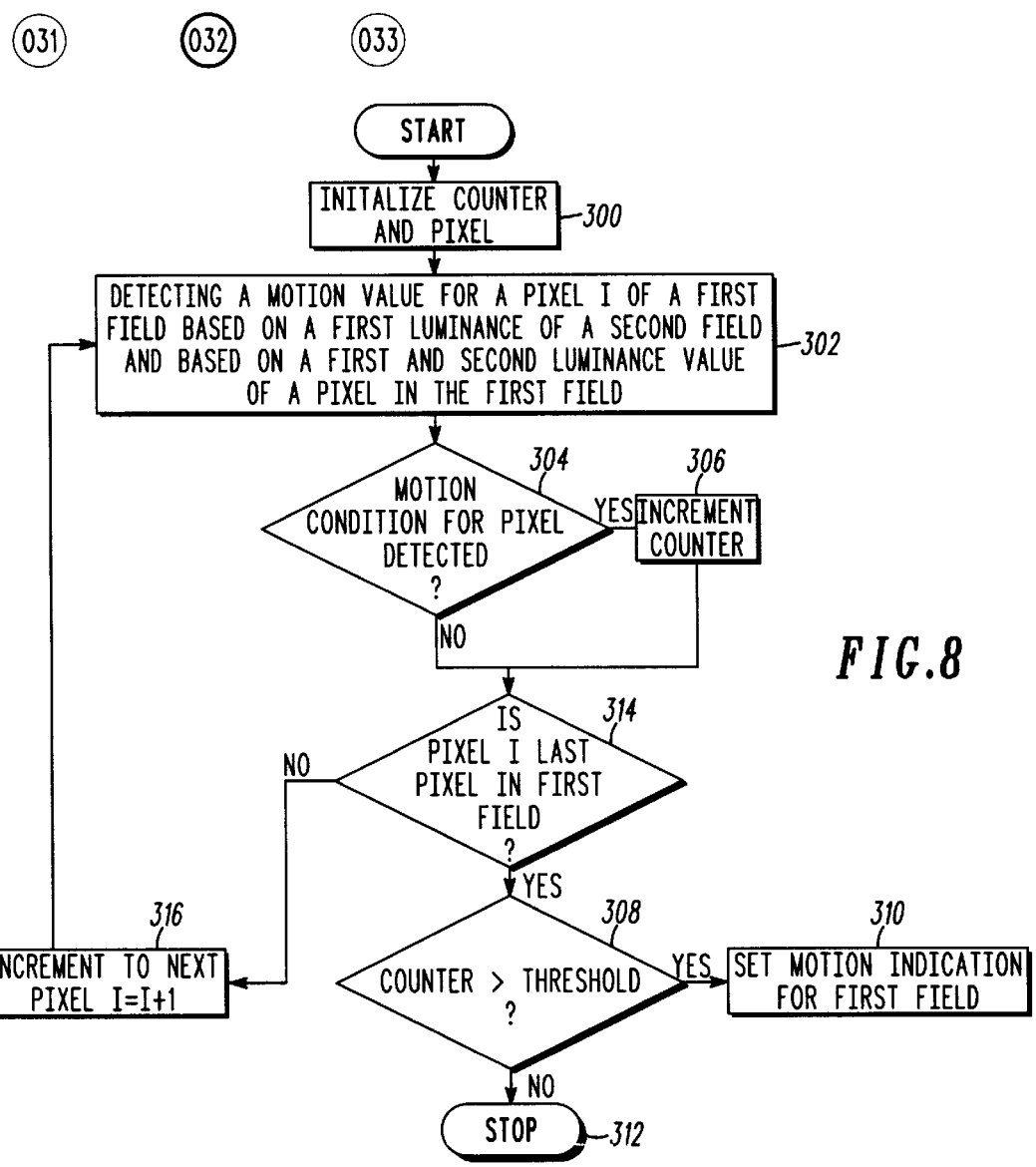
FIG. 8 is a flow chart of a method of determining a motion field indicator in accordance with the present invention.

If $\|Y(O_{02})-Y(O_{12})\| < \delta_3$ Then $Y(G_{21}) = \frac{7}{8}Y(O_{12}) + \frac{1}{8}Y(O_{22})$ $Y(E_{12}) = \frac{3}{4}Y(O_{12}) + \frac{1}{4}Y(O_{22})$ Else If $\|Y(O_{02})-Y(O_{12})\| < \delta_3$ Then $Y(G_{41}) = \frac{7}{8}Y(O_{22}) + \frac{1}{8}Y(O_{12})$ Else Then
$Y(G_{21}) = \frac{3}{4}Y(O_{12}) + \frac{1}{4}Y(O_{22})$
$Y(E_{12}) = 0.5[Y(O_{12}) + Y(E_{12})]$
$Y(G_{41}) = \frac{3}{4}Y(O_{22}) + \frac{1}{4}Y(O_{12})$ Referring to FIG. 8, a flow chart of a method of detecting motion in a field is illustrated. This method may be performed by a logic device that may be within the address generator 90 or may optionally be performed by an external logic device (not shown) in communication with the address generator 90. First, at step 300, a counter and a pixel identifier, i, is initialized. Preferably, the counter is initialized to zero and the pixel identifier,i, is initialized to designate the first pixel in a first field, e.g. the uppermost left pixel, such as pixel O11. Next, at step 302, a calculation is performed to determine whether the pixel i has a motion condition. This step is preferably performed as described in more detail in reference to step 200 of FIG. 6. At step 304, if a motion condition is detected, the counter is incremented, at step 306. The above process is then repeated until all of the pixels in the first field have been checked. At decision step 308, the counter value is compared to a threshold, such as a predetermined threshold. If the counter exceeds the threshold, then a motion indicator for the field is set at step 310, such as by setting a flag via a bit or a register. Otherwise, no motion indicator for the field is set. Processing for the field is completed, at 312, and the accumulated counter value may be stored in a memory or a register file for future use.

The above process may be repeated for a plurality of fields and the field motion indicator or the stored counter value may be evaluated to detect a pattern over the plurality of fields. The field motion indicator or the stored counter value for a plurality of fields or frames may be used to control other functions within the video processing system. For example, a plurality of counter values for a plurality of consecutive fields or frames may be used in a decision to select a particular set of interpolation coefficients from the memory 92. In this manner, knowledge gained from detected pixel motion and from interpolation data of prior frames may be used to fine tune and thereby improve the quality of the coefficients used in subsequent interpolation. In addition, the method of FIG. 8 may be performed in addition to and at the same time as the method of FIG. 4. Thus, any of the method steps described in reference to FIG. 4 may be also be performed by the method of FIG. 8. For example, while performing the process of detecting motion for a field as described in FIG. 8, the steps of generating interpolation pixels or performing horizontal interpolation for pixels in the field as described in FIG. 4 may also be performed.

Referring to FIG. 9–12, another embodiment of video processor 14 in accordance with the present invention is illustrated. This embodiment is preferred for implementation in a semiconductor device, such as in one or more application specific integrated circuits.

Figure 9:
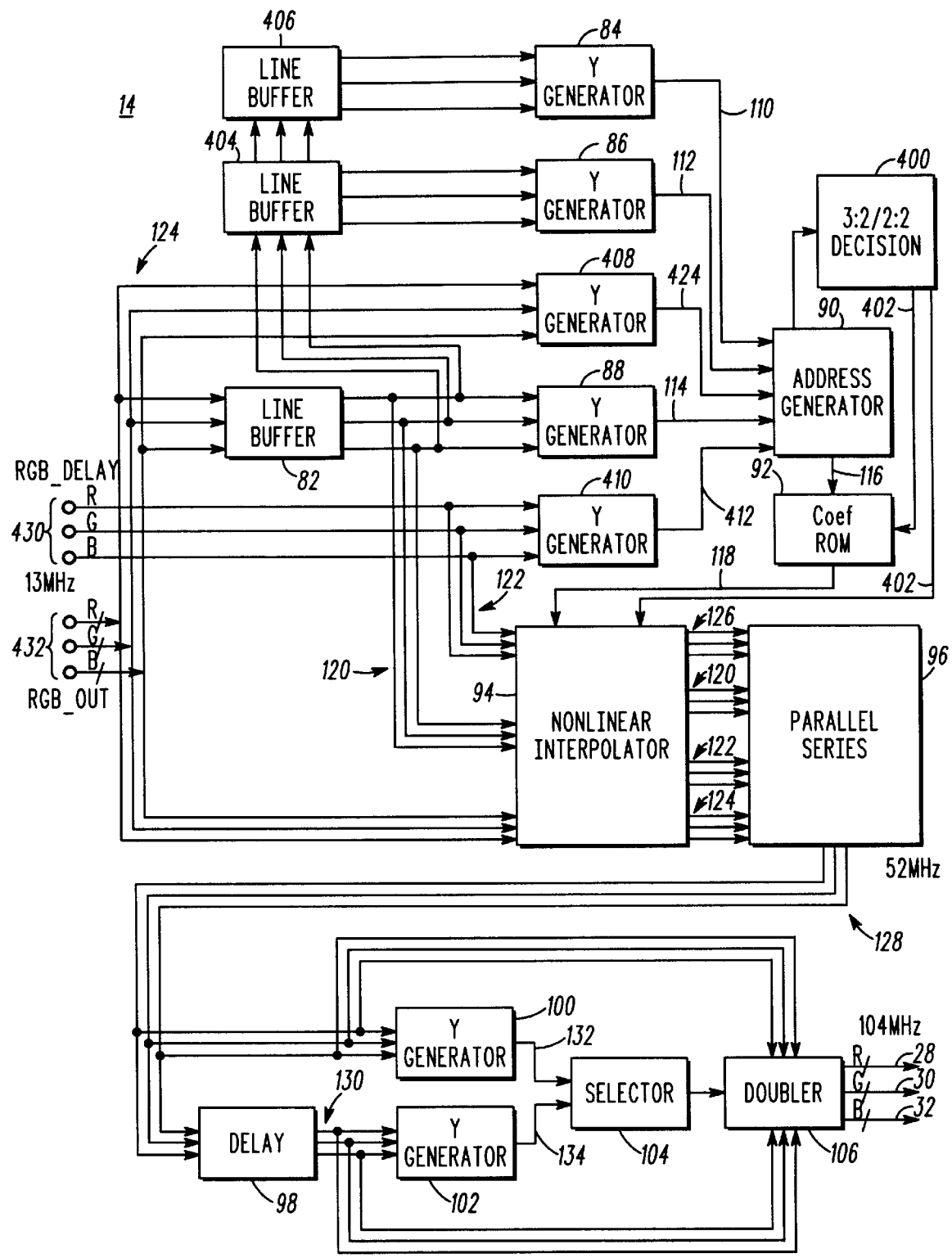
FIG. 9 is a block diagram of another embodiment of a video processor in accordance with the present invention.

Referring to FIG. 9, where like numerals represent like components from FIG. 2, the video processor 14 includes a sixth luminance generator 408, a seventh luminance generator 410, a second line buffer 404, a third line buffer 406, and a 3:2/2:2 decision logic module 400. The video processor 14 has a first color component input that receives a first color component signal 430, and a second input that receives a second color component delayed signal 432. The first color component signal 430 and the second color component signal 432 are each produced by a field buffer described below in reference to FIG. 10.

During operation, the color component input signal 430 is fed to luminance generator 410 and to interpolator 94. Input signal 432 is fed to interpolator 94, to line buffer 82, and to luminance generator 408. Line buffer 404 receives a one line buffered delayed signal from line buffer 82, and produces a two line buffer delayed signal for luminance generator 86. Similarly, line buffer 406 feeds a three line buffered delayed signal to luminance generator 84. Each of the luminance generators 84, 86, 408, 88, 410 output a respective luminance signal 110, 112, 424, 114, 412 to address generator 90. Decision unit 400 in response to address generator 90, produces an output signal 402 for memory 92 and for interpolator 94. To determine an interpolation decision, address generator 90, in response to the five luminance values, and based on the logic rules described above in reference to FIG. 7, generates an address to the read only memory 92 to select a set of interpolation coefficients for input to the interpolator 94. In the preferred embodiment, the memory 92 includes at least 16 sets of predetermined interpolation coefficients as set forth in the previous equations.

In a quadruple design, each time two input data items are received at the interpolator 94, four data items are produced, but the input/output rate can be modified based on particular design requirements. Concurrently with interpolation coefficient selection in address generator 90, the decision unit 400 evaluates an interpolation factor, such as an accumulated count of a number of interpolated pixels, for a plurality of frames. The interpolation factor is preferably saved in a register file for N frames, where N is typically greater than 9.

Figure 10:
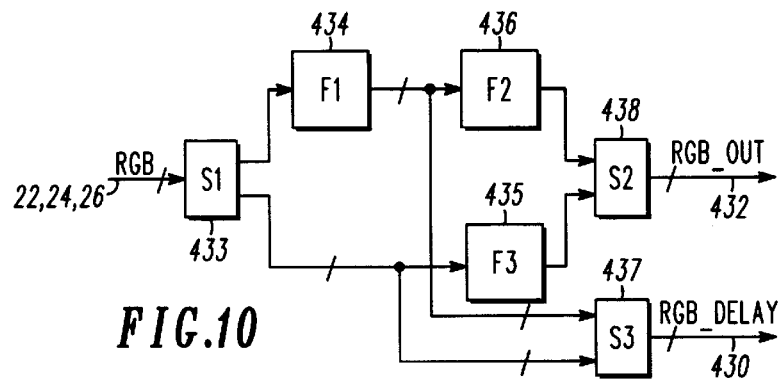
FIG. 10 is a block diagram of field buffers to be used with the video processor of FIG. 9.

Referring to FIG. 10, a field buffer module coupled to the video processor 14 is illustrated. The field buffer module includes a first field buffer 434, a second field buffer 436, and a third field buffer 435. The field buffer module further includes a first multiplexor 433, a first demultiplexor 438, and a second dumultiplexor 437. The field buffer module receives RGB input signals 22, 24, 26 and produces a first color space output signal 432 and a second color space delay output signal 430.

The field buffer module is used to buffer one field for operation and perform 3:2/2:2 pulldown buffer for frame buffer display.

In the first operation, field buffer F3 is used and switches S1, S2, and S3 switch to F3.

In the 3:2/2:2 pulldown buffer operation, switcher S1 switches to F1, switcher S2 switches to F2, and switcher S3 switches to F1/F2 for the frame buffer to display in 2 or 3 frames per period.

Where the video processor 14 is implemented in a design that does not require the decision unit 400, such as applications that do not require 3:2 pulldown, the field module may be replaced with a single field buffer.

Figure 11:
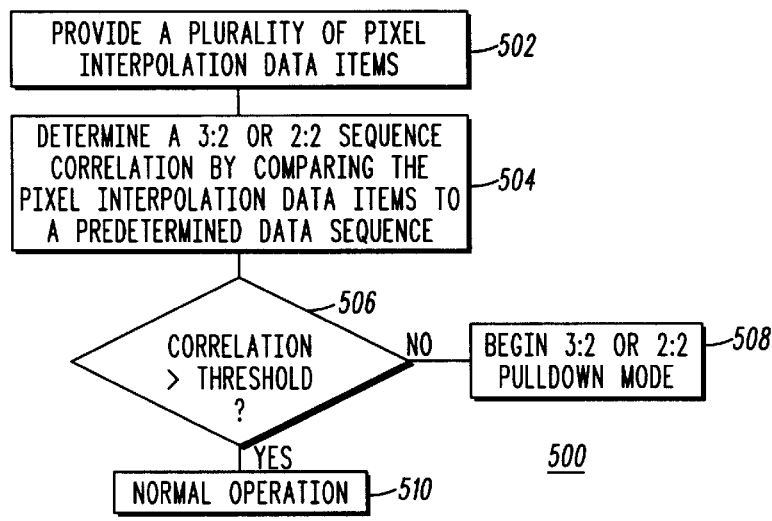
FIG. 11 is a flow chart of a detection method in the decision unit of FIG. 9.

Referring to FIG. 11, a flow chart of a method of detecting either 3:2 pulldown or 2:2 pulldown that may be performed by the decision unit 400 is illustrated. First, at step 502, a plurality of pixel interpolation data items are provided. Preferably, the data items include a sequence of interpolation pixel count values from a plurality of sequential frames of input video. The count values may be generated by saving accumulated counter values after a set of pixels, such as a field, a frame, or a portion of a field or a frame, is processed by the method described in reference to FIG. 8 above. Next, at step 504, a correlation indicator is determined by comparing the plurality of interpolation data items, such as the count values, with corresponding data item from a predetermined data sequence that corresponds to a specific condition of the input video. For example, where the input video is produced from film, the pixel interpolation data will have a specific 3:2 pulldown sequence. An example 10-frame 3:2 prediction data sequence for NTSC is 174240, 1, 174240, 174240, 1, 174240, 1, 174240, 174240, 1. Another sequence that may be detected is known as a 2:2 pulldown sequence which is often used in computer applications. An example of prediction data for a 10 frame 2:2 pulldown sequence is 174240, 1, 174240, 1, 174240, 1, 174240, 1, 174240, 1. By detecting certain characteristics of the input video, such as 3:2 pulldown from film, the video processor 14 may be configured to more accurately perform interpolation and thereby produce a higher quality video signal on a display. For example, when either 3:2 pulldown or 2:2 pulldown is detected, a special set of coefficients from memory 92 may be selected and the interpolator 94 may perform interpolation based on the following equations:

During a movie (3:2 pulldown) or computer display mode (2:2 pulldown), the luminance value Y(E12) is selected. In these modes, the pixel interpolation is based on the following formulas:

$R(G_{21}) = \frac{7}{8} R(E_{12}) + \frac{1}{8} R(O_{12})$;
$G(G_{21}) = \frac{7}{8} G(E_{12}) + \frac{1}{8} G(O_{12})$;
$B(G_{21}) = \frac{7}{8} B(E_{12}) + \frac{1}{8} B(O_{12})$;
$R(E_{12}) = R(E_{12})$;
$G(E_{12}) = G(E_{12})$;
$B(E_{12}) = B(E_{12})$;
$R(G_{41}) = \frac{1}{8} R(E_{12}) + \frac{7}{8} R(O_{22})$;
$G(G_{41}) = \frac{1}{8} G(E_{12}) + \frac{7}{8} G(O_{22})$;
$B(G_{41}) = \frac{1}{8} B(E_{12}) + \frac{7}{8} B(O_{22})$;

Next, at step 506, the correlation indicator determined in step 504 is compared to a threshold. If the correlation indicator is above the threshold, then no special sequence is detected and normal interpolation operation continues, at step 510. However, if the correlation is less than the threshold, then a specific sequence is detected and interpolation is performed based on the detected sequence, e.g. 3:2 pulldown mode or 2:2 pulldown mode, at step 508. Thus, the above method 500 provides improved video quality by detecting when video data correlates to a predetermined data sequence.

Figure 12:
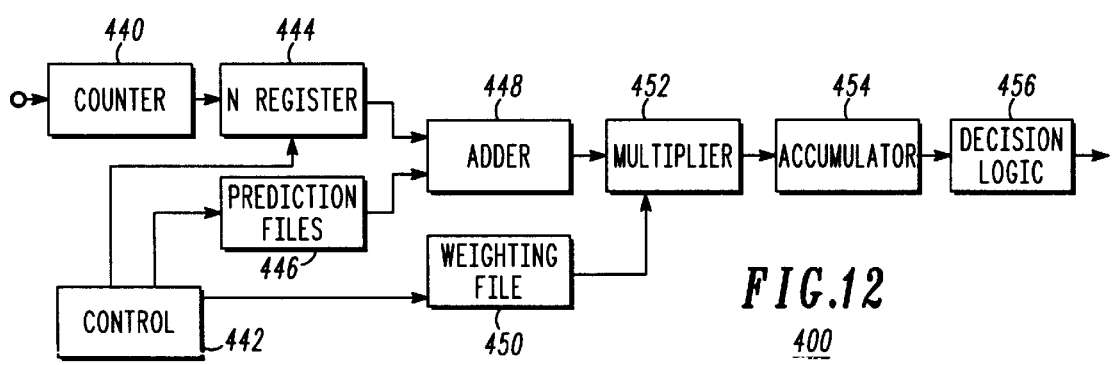
FIG. 12 is a block diagram of the decision unit of FIG. 9.

An example of a specific hardware implementation of the method of FIG. 11 is shown in FIG. 12. Referring to FIG. 12, an illustrative block diagram of the decision unit 400 is illustrated. The decision unit includes a counter 440, a size N register file 444, a prediction file 446, a weighting file 450, a control logic unit 442, an adder 448, a multiplier 452, an accumulator 454, and decision logic 456. The decision unit 400 produces one of three results, normal operation, 3:2 pull down, and 2:2 pull down. The prediction file 446 includes a first predetermined data sequence that identifies 3:2 pulldown and a second data sequence that identifies 2:2 pulldown. The register file 444 is responsive to the counter 440 and stores a plurality of counts for the number of pixels interpolated for a plurality of video frames. In the preferred embodiment, the register file 444 includes at least 9 items. A correlation measure is determined by multiplying an appropriate weighting factor from the weighting file by an absolute value of a difference between a count from the register file 444 and a corresponding data sequence item from the prediction file 446. For example, the weighting file can include a first weighting factor of 5 for motion and a second weighting factor of 1 for no motion. The output from the multiplier 452 for each count in the register 444 is then summed by accumulator 454 yielding the correlation result. Decision logic 456 then compares the correlation result to a threshold and provides an output 402 of either normal operation, 3:2 pulldown, or 2:2 pulldown which is passed to the interpolator 94 and to the coefficient read only memory 92. Preferably, the threshold corresponds to a correlation weighted error from about 1% to about 5%. However, other thresholds may be used. Operation and timing for the above processing steps is controlled by the controller 442. The determination of whether the input video signal is in one of a normal, 3:2 pulldown, or 2:2 pulldown mode, is continually performed by the decision unit 400. In this manner, the video processor 14 can quickly account for changes in the input video signal by switching to the appropriate interpolation mode of operation.

In an alternative design, the decision unit 400 can include a video compression processor, such as a standard MPEG processor, to perform block by block motion estimation. The blocks have a size of 16×16 pixels. The result from the video compression processor indicates motion or no motion for a field and can be used to detect 3:2 pulldown or 2:2 pulldown.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In an video processing system, a method of detecting and compensating for motion of an image comprising the steps of:

detecting a first pixel value, a second pixel value, and a third pixel value, the first pixel value of a first scan line in a first field, the second pixel value of a second scan line in the first field, and the third pixel value of a scan line in a second field;

providing a motion indicator based on the first, second, and third pixel values;

selecting a plurality of interpolation coefficients from a memory based on the motion indicator; and providing an interpolated color space pixel based on a first color space pixel associated with the first pixel value, a second color space pixel associated with the second pixel value, and based on the plurality of interpolation coefficients.

2. The method of claim 1, wherein the first, second, and third pixel values comprise luminance pixel values.

3. The method of claim 1, wherein the interpolated color space pixel is based on a third color space pixel associated with the third pixel value.

4. The method of claim 1, further comprising providing a second interpolated color space pixel.

5. The method of claim 1, wherein the interpolated color space pixel includes a first color component, a second color component, and a third color component.

6. The method of claim 1, further comprising the step of taking a difference between the second pixel value and one of the first and third pixel values to produce a difference value and comparing the difference value to a threshold.

7. The method of claim 1, further comprising the step of horizontally interpolating a color space pixel.

8. A video processing system to detect motion of an image comprising:
   a decoder;
   a video signal processor responsive to the decoder, the video signal processor comprising:
      a memory including a first set of coefficients and a second set of coefficients;
      an address generator providing an address signal to select one of the first and second sets of coefficients, the address signal responsive to a motion indicator signal, the motion indicator signal based on first, second, and third pixel values, the first pixel value of a first scan line in a first field, the second pixel value of a second scan line in the first field, and the third pixel value of a scan line in a second field; and
      an interpolator module responsive to the memory and to the address generator; and
   an encoder responsive to the video signal processor.

9. In an video processing system, a method of detecting motion of an image comprising the steps of:
   initializing a counter;
   detecting a first pixel value, a second pixel value, and a third pixel value, the first pixel value of a first scan line in a first field, the second pixel value of a second scan line in the first field, and the third pixel value of a scan line in a second field;
   comparing the second pixel value and at least one of the first and third pixel values;
   incrementing a counter based on a result of the comparison; and
   providing a motion indicator signal based on the counter.

10. The method of claim 9, further comprising the step of repeating the second, third and fourth steps a number of times before providing the motion indicator signal.

11. The method of claim 10, further comprising the step of selecting a plurality of interpolation coefficients from a memory based on the motion indicator signal.

12. The method of claim 10, further comprising the step of producing a color space interpolated pixel based on a first color space pixel associated with the first pixel value, a second color space pixel associated with the second pixel value, and based on the interpolation coefficients.

13. The method of claim 12, wherein the color space interpolated pixel is a sum of a first color space pixel weighted by a first of the plurality of coefficients and a second color space pixel weighted by a second of the plurality of coefficients.

14. The method of claim 10, further comprising providing a plurality of motion indicator signals.

15. The method of claim 10, wherein the first scan line is adjacent to the second scan line.

16. The method of claim 10, further comprising the steps of offsetting one of the first and the third pixel values by a first offset value to produce a first offset pixel value, offsetting the other of the first and the third pixel values by a second offset to produce a second offset pixel value, and comparing the second pixel value with one of the first and second offset pixel values.

17. A video signal processor to detect motion of an image comprising:
   a field buffer;
   a line buffer;
   a first luminance generator;
   a second luminance generator responsive to the field buffer;
   a third luminance generator responsive to the line buffer;
   an address generator responsive to the first, second, and third luminance generators, the address generator generating an address signal based on a comparison of a first luminance value from the first luminance generator, a second luminance value from the second generator, and a third luminance value from the third luminance generator, the first and third luminance values corresponding to at least one pixel of a first field and the second luminance value corresponding to a pixel of a second field;
   a memory responsive to the address generator, the memory producing color space interpolation coefficients based on the address signal; and
   an interpolator responsive to the field buffer, the line buffer, and the memory, the interpolator producing a color space interpolated signal based on the color space interpolation coefficients.

18. The video signal processor of claim 17, further comprising a horizontal interpolation module.

19. The video signal processor of claim 18, wherein the horizontal interpolation module comprises a delay unit, a fourth luminance generator, a fifth luminance generator, and a selector.

20. The video signal processor of claim 17, further comprising a video compression processor coupled to the address generator.

21. The method of claim 9, further comprising the steps of:
   providing a plurality of pixel interpolation data items, each of the data items comprising a count of a number of interpolated pixels in a set of pixels;
   determining a correlation by comparing the plurality of pixel interpolation data items with a predetermined data sequence; and
   comparing the correlation to a threshold.

22. The method of claim 21, wherein the set of pixels comprises one of a field and a frame.

23. The method of claim 21, wherein the predetermined data sequence comprises one of a 3:2 pulldown data sequence and a 2:2 pulldown data sequence.

* * * * *